United States Patent
Wang et al.

(10) Patent No.: US 7,310,633 B1
(45) Date of Patent: Dec. 18, 2007

(54) METHODS AND SYSTEMS FOR GENERATING TEXTUAL INFORMATION

(75) Inventors: Niniane Wang, Santa Clara, CA (US); Stephen R. Lawrence, Mountain View, CA (US)

(73) Assignee: Google Inc., Mountain View, CA (US)

(*) Notice: Subject to any disclaimer, the term of this patent is extended or adjusted under 35 U.S.C. 154(b) by 517 days.

(21) Appl. No.: 10/814,487

(22) Filed: Mar. 31, 2004

(51) Int. Cl.
*G06F 17/30* (2006.01)
*G06F 7/00* (2006.01)

(52) U.S. Cl. .............................................. 707/3; 707/1
(58) Field of Classification Search .................... 707/1, 707/3, 4, 100
See application file for complete search history.

(56) References Cited

U.S. PATENT DOCUMENTS

| | | |
|---|---|---|
| 6,006,222 A | 12/1999 | Culliss |
| 6,014,665 A | 1/2000 | Culliss |
| 6,078,916 A | 6/2000 | Culliss |
| 6,182,068 B1 | 1/2001 | Culliss |
| 6,581,056 B1 | 6/2003 | Rao |
| 2002/0095427 A1* | 7/2002 | Kaplan ....................... 707/102 |
| 2003/0079185 A1* | 4/2003 | Katariya et al. ............ 715/530 |
| 2003/0167266 A1 | 9/2003 | Saldanha et al. |
| 2004/0143569 A1 | 7/2004 | Gross et al. |
| 2004/0225667 A1* | 11/2004 | Hu et al. .................... 707/100 |

OTHER PUBLICATIONS

U.S. Appl. No. 10/749,440, filed Dec. 31, 2003, Badros et al.

80-20 Software—Products—80-20 One Search, http://www.80-20.com/products/one-search/retriever.asp. printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web," IBM Research, http://www.almaden.ibm.com/cs/wbi/papers/chi97/wbipaper.html, pp. 1-13, printed Mar. 16, 2004.
Battele, J., CNN.com "When geeks go camping, ideas hatch," http:/www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.
Bradenbaugh, F., "Chapter 1 The Client-Side Search Engine," *JavaScript Cookbook*, 1st Ed., Oct. 1999, O'RELLY™ Online Catalog, http://www.oreilly.com/catalog/iscook/chapter/ch01.html, pp. 1-30, printed Dec. 29, 2003.

(Continued)

*Primary Examiner*—Sam Rimell
*Assistant Examiner*—Alicia M Lewis
(74) *Attorney, Agent, or Firm*—Fenwick & West LLP

(57) ABSTRACT

Methods and systems for generating textual information are disclosed. In one exemplary embodiment, a method of generating textual information is disclosed that comprises identifying a plurality of candidate summaries related to textual information based at least in part on a document, determining first and second attribute values based at least in part on the candidate summaries, and determining an optimal candidate summary based at least in part on the first and second attribute values.

33 Claims, 2 Drawing Sheets

OTHER PUBLICATIONS

Brin, S., et al., "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-technologies.com/products/devonthink.php, printed Mar. 16, 2004.

dtSearch®—http://www.dtsearch.com/, printed Mar. 15, 2004.

Dumais, s., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-4, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Towards Class with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http:/research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Intoruding the New . . . , http:/msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http:/redherring.com/PrintArticle/aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Release Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental link Transitions," Proceedings of Hypertext'98, Pittsburgh, PA, Jun. 20-24, 1998, pp. 50-57.

* cited by examiner

METHODS AND SYSTEMS FOR GENERATING TEXTUAL INFORMATION

This application relates to U.S. Utility patent application Ser. No. 10/814,486 filed herewith and entitled, "Methods and Systems for Processing Textual Information," the entirety of which is incorporated herein by reference.

FIELD OF THE INVENTION

The invention generally relates to methods and systems for generating textual information.

BACKGROUND

As World Wide Web ("web") search engines (sometimes referred to as "Internet Search Engines") have improved, many users have turned to these search engines for navigating the web, rather than inputting uniform resource locators (URLs) into browser address fields or using browser bookmarks. Search engines may perform searches of various databases, which may be public, e.g., the Internet, and/or private, e.g., an intranet, a client device, etc., using one or more known search techniques. For example, one known search technique, described in an article entitled, "The Anatomy of a Large-Scale Hypertextual Search Engine," by Sergey Brin and Lawrence Page, assigns a degree of importance to a document, such as a web page, based on the link structure of the web.

As efficient as a search engine may be, its value to a user may be limited by the manner in which the search engine provides a summary of search results to a user. For instance, search engines generally provide summaries (sometimes referred to as "snippets") of documents or websites located in response to a query. A user browses such summaries, and typically selects a link associated with a summary that best matches the search criteria to view the entire document or to navigate to the desired web page. Summaries that provide too much information can consume output (e.g., display) resources and can overwhelm a user with extraneous information, which can slow down the user's search. Summaries that provide too little information may not provide the user with sufficient information to identify relevant documents. In either case, such summaries are generally ineffective in aiding a user's search for desired information.

SUMMARY

Embodiments of the present invention comprise methods and systems for generating textual information. In one exemplary embodiment, a method of generating textual information is disclosed that comprises identifying a plurality of candidate summaries related to textual information based, at least in part, on a document, determining first and second attribute values based, at least in part, on the candidate summaries, and determining an optimal candidate summary based at least in part on the first and second attribute values.

In another exemplary embodiment, a method comprises searching a document, identifying a keyword disposed in the document, identifying a plurality of candidate summaries related to textual information based, at least in part, on the document, determining a number of storage locations for the plurality of candidate summaries, combining the plurality of candidate summaries into a plurality of combined candidate summaries, determining first and second attribute values based, at least in part, on the candidate summaries, selecting from the plurality of combined candidate summaries a first highest-weighted combined candidate summary and a second highest-weighted combined candidate summary, determining an optimal candidate summary based at least in part on the first and second attribute values, and comparing the first and second highest-weighted combined candidate summaries. In one embodiment the number of storage locations can be based, at least in part, on a size of the document. In another embodiment, determining the optimal candidate summary may be further based at least in part on the comparison of the first and second highest-weighted combined candidate summaries.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention.

DETAILED DESCRIPTION

Embodiments of the present invention include methods and systems for generating textual information. Exemplary embodiments are described herein.

System Architecture

Figure 1:
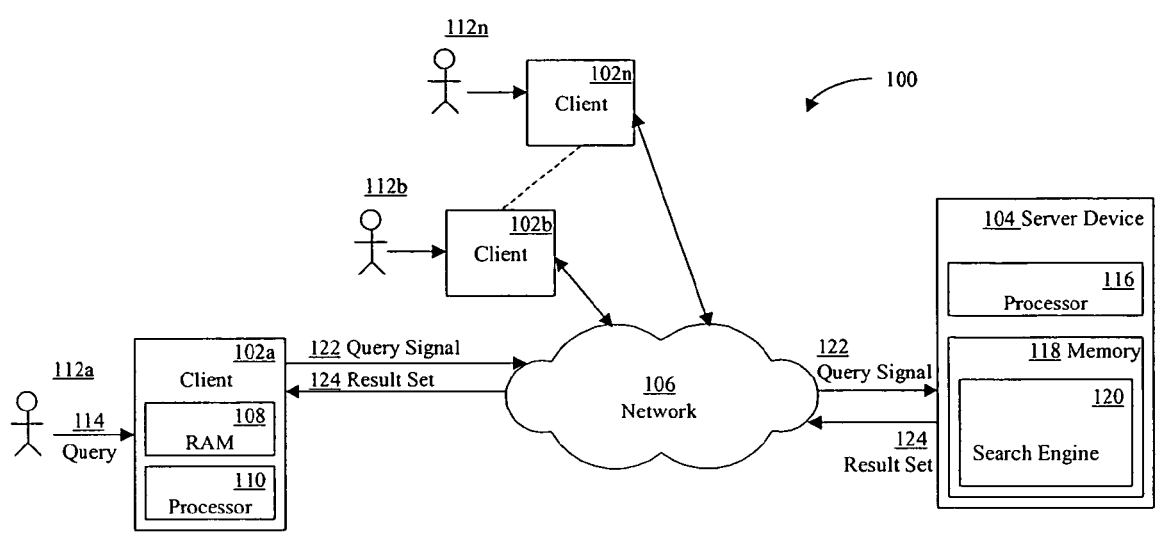
FIG. 1 is a block diagram of an exemplary embodiment for implementing an embodiment of the present invention.

Referring now to the drawings in which like numerals indicate like elements throughout the several figures, FIG. 1 is a block diagram illustrating an exemplary embodiment of the present invention. The system 100 shown in FIG. 1 includes multiple client devices 102a-n in communication with a server device 104 over a network 106. The network 106 shown comprises the Internet. In other embodiments, other networks, such as an intranet may be used. Moreover, methods according to the present invention may operate within a single computer.

The client devices 102a-n shown each include a computer-readable storage medium, such as a random access memory (RAM) 108, coupled to a processor 110. The processor 110 executes computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any operating system capable of supporting a browser or browser-enabled application, such as Microsofti® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106. The server device comprises a server processor 116 and a server memory storage device 118. The server device 104 shown comprises a single computer. However, in other embodiments, the server device 104 may comprise multiple and/or distributed devices, or there may be no server device.

In one embodiment, a user 112a-n generates a search query 114 at a client device 102a. The client device 102a transmits the query 114 to the server device 104 via the network 106. For example, a user 112a types a textual search query into a query field of a web page of a search engine interface or other client-side software displayed on the client device 102a, which is then transmitted via the network 106 to the server device 104.

In the embodiment shown, a user 112a inputs a search query 114 at a client device 102a, which transmits an associated search query signal 122 reflecting the search query 114 to the server device 104. The search query 114 may be transmitted directly to the server device 104 as shown. In another embodiment, the query signal 122 may instead be sent to a proxy server (not shown), which then transmits the query signal 122 to server device 104. Other configurations are possible.

The server device 104 shown includes a server executing a search engine application program, such as the Google™ search engine. Similar to the client devices 102a-n, the server device 104 shown includes a processor 116 coupled to a computer-readable memory 118. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the search engine application program, also known as a search engine 120. The search engine 120 locates relevant information in response to a search query 114 from a user 112a-n. The search engine 120 then provides the result set 124 to the client 102a via the network 106.

In the embodiment shown, the server device 104, or related device, has previously performed a crawl of the network 106 to locate articles, such as web pages, stored at other devices or systems connected to the network 106, and indexed the articles in memory 118 or on another data storage device. Articles include, for example, web pages of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image.

It should be noted that various embodiments of the present invention may comprise systems having different architecture than that which is shown in FIG. 1. For example, in some systems according to the present invention, server device 104 may comprise a single physical or logical server, or there may be no server. The system 100 shown in FIG. 1 is merely exemplary, and is used to explain the exemplary method shown in FIG. 2.

Process And Example

Various methods may be implemented in the environment shown in FIG. 1 and other embodiments, according to the present invention. Methods according to the present invention may be implemented by, for example, a processor-executable program code stored on a computer readable storage medium.

Figure 2:
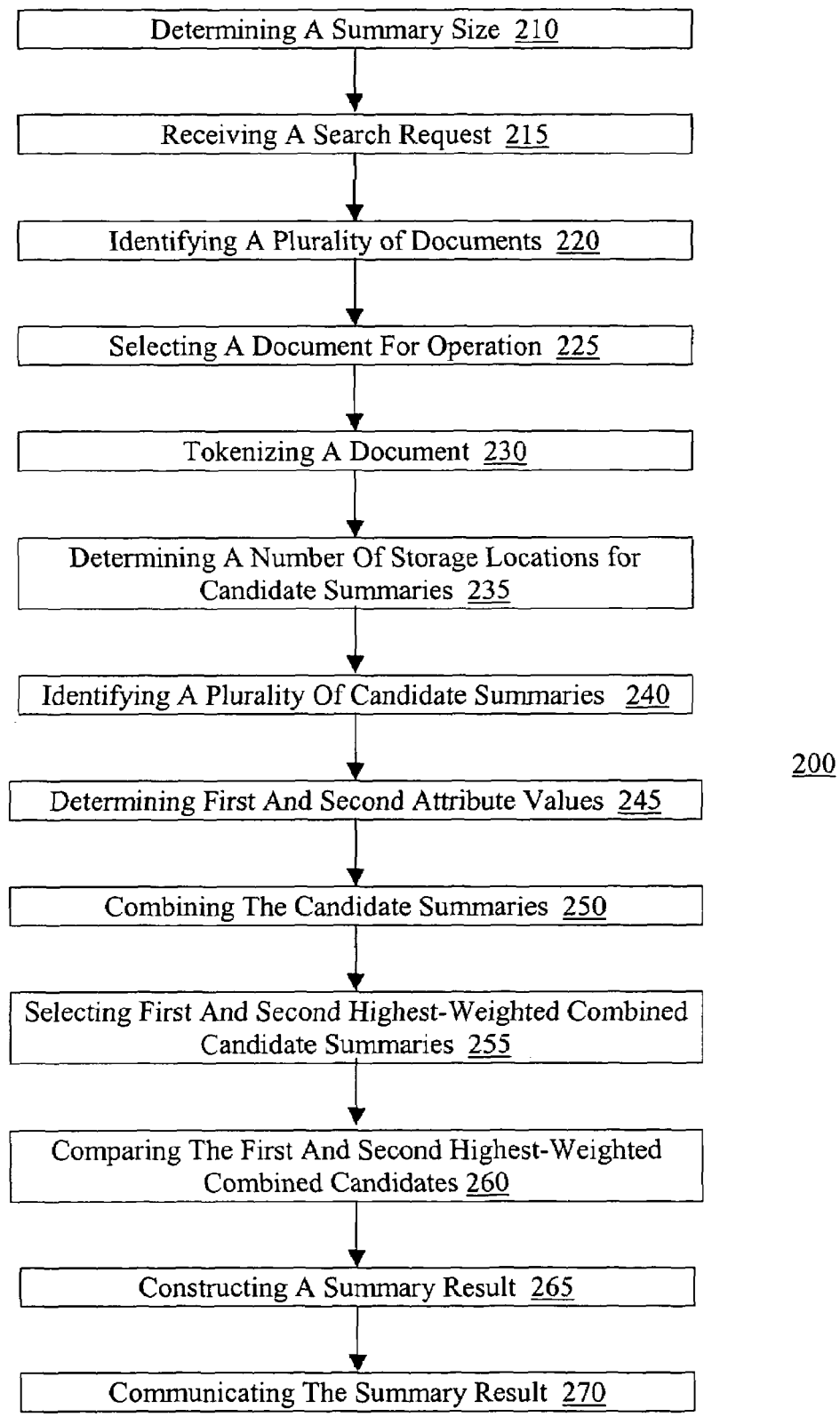
FIG. 2 is a block diagram of a method according to an embodiment of the present invention.

Referring now to FIG. 2, a method 200 according to one embodiment of the present invention is shown. The method 200 may be used to enhance use of and navigation through a retrieved collection of search results which may identify documents or websites. The method 200 may be further used to refine a query such that the desired information may be obtained more precisely. For example, the method 200 may be used to generate a candidate summary of a document, website, or other information, which may include textual information.

An example of the method 200 comprises examining and processing a document returned as part of a search-result set to generate a candidate summary of the document. The method 200 will be described below with reference to an example, the purpose of which is to aid understanding of the present invention. Thus, it is to be understood that the present invention is not limited to the example described below.

As indicated by block 210, the method 200 comprises determining a candidate summary size. As described above, a lengthy document summary may provide so much information to the user 112a, that the user 112a cannot effectively and/or efficiently process the generated information. Thus, a desired size of the summary can be predetermined. In one embodiment, the user 112a requests a result set 124 to include a summary or summaries not to exceed a desired length of a character string, for example, a character string of 30, 40, 50, or 60 characters, etc. In another embodiment, the length of the summary character string can be determined dynamically by the processor. For purposes of the present example, the summary length is 40 characters.

In one embodiment, the user 112a requests a result set 124 to include a summary or summaries not to exceed a specified number of pixels on a display. This can be useful when the available space for the summary is relatively small and/or is desirable that the summary fits in a specific number of lines in the display. The number of pixels may be determined based at least in part on the size of the display. For example, if results are displayed in a browser, a length of the candidate summary may be generated appropriate for the size of the browser window (e.g., the candidate summary occupies a specific number of lines of the display).

As indicated by block 215, the method 200 comprises receiving a search request. In the present example of the method 200, a user 112a generally submits a search query 114 for a particular document or documents that include a desired keyword included in the query (a keyword is defined broadly herein to mean one or more terms, such as words, acronyms, or other character strings). The query 114 is communicated as a query signal 122 over the network 106 to server device 104. In one embodiment, a summary may be generated for results obtained via automatic implicit queries.

For example, the keyword may comprise a particular search term or string of search terms. In one embodiment, a keyword is communicated by the query signal 122 to the processor 116. The processor 116 identifies keywords from an input string disposed in the document and/or from the list of tokens, i.e., the tokenized document.

As indicated by block 220, the method 200 comprises identifying a plurality of documents. The documents may include documents located on a dedicated server, a local network, or the internet. In an embodiment, the document comprises a number of character strings. In another embodiment, the document comprises a number of words and/or other textual information. For example, the documents may include webpages or other textual information. Generally, the documents are searched for the keyword query, and documents that include the keyword are identified by the server device 104.

As indicated by block 225, the method 225 comprises selecting a document for operation. In one embodiment, documents may be selected by the presence of one or more keywords in the document. In another embodiment, documents may be selected by a relative weighting or scoring system, such as, for example the number of occurrences of the keyword in the document. Other suitable methods of selecting documents can be used. In one embodiment, a plurality of text documents may be retrieved by the search engine 120 in response to the query signal 122, and operated upon.

As indicated by block 230, the method 200 comprises tokenizing a document. To manipulate and process a document, it may be necessary to tokenize, e.g., parse, the document into character strings or words. As used herein, tokenizing generally refers to separating an input string into a list of tokens, such as for example, contiguous character strings representing a plurality of individual words. In an embodiment, an input string is separated on "white space," i.e., gaps or breaks, between individual characters. The input string can also be separated on punctuation or other non-alphanumeric characters. In one embodiment, multiple words may be treated as a single token, such as for example, a string enclosed in double quotes, proper names, dates, and times. Alternatively, other suitable rules for tokenizing can be used.

As indicated by block 235, the method 200 comprises determining a number of storage locations for candidate summaries related to textual information based, at least in part, on the document. For example, the storage locations may be used to store data retrieved or extracted from the document or documents for further processing and/or manipulation. In one embodiment, each of the storage locations comprises a bucket. In an embodiment, a bucket refers to a temporary or permanent data repository, such as for example, a memory cache.

In one embodiment, the number of storage locations is based, at least in part, on at least one of a size of a document, a desired size of the candidate summary, and a number of query terms. A larger document generally will include a greater number of storage locations than a comparatively smaller document. In one embodiment, the number of storage locations is also based, at least in part, on the number of keywords in the search query, so that a query with more keywords will generate greater number of storage locations for candidate summaries. In another embodiment, the number of storage locations is limited to a predetermined number regardless of the size of the document. In the present example, the number of storage locations is limited to 20 buckets.

As indicated by block 240, the method 200 comprises identifying a plurality of candidate summaries related to textual information based, at least in part, on the document. In one embodiment, the candidate summaries comprise snippets of text or textual information. Methods of generating candidates are described in co-pending application Ser. No. 10/814,486, the entirety of which is incorporated herein by reference. In one embodiment, the document is tokenized until a predetermined number of candidate summaries is generated. In another embodiment, the number of candidate summaries is dynamically determined.

As will be described in further detail below, the candidate summaries can be used to generate a summary of the document. In one embodiment, the candidate summaries comprise candidate text or other data for possible placement in a summary of a document. The plurality of candidate summaries can be, for example, textual information based, at least in part, on a document. In one embodiment, textual information based, at least in part, on a document comprises a keyword found in a document and a character string disposed proximate to the keyword. The character string may include an entire sentence or portions of the sentence including the keyword. The character string may also include a predetermined number of words or characters disposed before and after the keyword. In another embodiment, the candidate summaries comprise one or more keywords.

The character string can comprise a first character string and a second character string. In an embodiment, the first character string comprises a first number of words (e.g., five, ten, fifteen, etc.) and the second character string comprises a second number of words (e.g., five, ten, fifteen, etc.). Generally, the first and second character strings can be disposed on opposing ends of the keyword.

As indicated by block 245, the method 200 shown in FIG. 2 comprises determining first and second attribute values based, at least in part, on the candidate summaries. Generally, the first and second attribute values can be used to generate the document summary. The use of the first and second attribute values to generate the document summary will be described in further detail below. In one embodiment, the first and second attribute values may correspond to a total number of words, and can be mapped onto the bucket.

For example, the number of words comprises a total number of words in the first character string, the keyword, and the second character string.

In one embodiment, a user 112*a* selects the first and second attribute values. For example, the user 112*a* may specify a first attribute value of 40 characters and a second attribute value of 45 characters. In another embodiment, the first and second attribute values are automatically generated by, for example, the processor 116. In one embodiment, the second attribute value may be greater than the first attribute value. In one embodiment, the size of the document summary is limited to the second attribute value. In the present example, the first attribute value is 40 characters and the second attribute value is 50 characters.

As described above, the number of characters provided herein are presented for the sake of example only. Other suitable numbers of characters can be used. Furthermore, different numbers of characters can be used for different categories of documents, such as, for example, web results and e-mails. Moreover attribute values can also be based, at least in part, on pixel width and number of lines.

In another embodiment, the first and second attribute values comprise a pixel size. Certain string characters occupy less space than other characters in many fonts. For example, in many fonts, the letter "i" is fewer pixels wide than the letters "m" or "w" and thus occupies less space. Therefore, two storage locations, each having a capacity of 25 pixels, may hold a different number of words depending on the pixel size of the words in a particular character string. Alternatively, other suitable attribute values can be used.

As indicated by block 250, the method 200 comprises combining the plurality of candidate summaries into a plurality of combined candidate summaries. The combined candidate summaries can form a document summary. In one embodiment, a first combined candidate summary does not exceed the first attribute value (in the present example 40 characters) and a second combined candidate summary does not exceed the second attribute value (in the present example 50 characters).

In the present example, the processor 116 determines or identifies the highest-weighted candidate having a length of five characters. The processor 116 repeats this process in increments of five characters, until the highest weighted 40-character string is identified. Of course, other suitable increments can be used. In one embodiment, the increment is based at least in part on a maximum number of desired characters in the candidate summary.

The processor 116, combines the plurality of identified candidates in the predetermined increments such that a first set of combined candidates does not exceed the total number of desired characters. For example, when the total number of desired characters is 40 characters, the highest-weighted 10-character candidate summary is combined with the highest-weighted 30-character candidate summary and the highest-weighted 15-character candidate summary is combined with the highest-weighted 25-character candidate summary.

In the present example, the group of 40-character candidates (i.e., the first set) combined in this manner are compared to one another and the processor 116 selects the highest-weighted 40-character candidate (i.e., the first highest-weighted combined candidate).

As indicated by block 255, the method 200 comprises selecting from the plurality of combined candidate summaries a first highest-weighted combined candidate summary and a second highest-weighted combined candidate summary. The candidates are weighted using one or a combination of factors, such as described in co-pending application Ser. No. 10/814,486, the entirety of which is incorporated herein by reference. In one embodiment, the weighting of the combined candidate summary is the sum of the weighting of the individual candidate summaries. Other formulae for combined weighting are possible, however, in alternate embodiments.

In another embodiment, the weighting is adjusted based at least in part on a percentage of keywords that are included within the candidate summary, so that a combined candidate which includes a greater number of the query keywords can have a higher adjusted weight than a combined candidate summary which includes a lesser number of query keywords. In another embodiment, the weighting is adjusted by a number of words in the combined candidate summary, so that candidate summaries with more words can have a higher weighting. In a further embodiment, the first and second highest-weighted combined candidates are further based, at least in part, on a percentage of keywords included in the plurality of keyword summaries.

As indicated by block 260, the method 200 comprises comparing the first and second highest-weighted combined candidates. The greater of the first and second highest-weighted combined candidate summaries generally represents an optimal summary of the document. In one embodiment, the method 200 comprises determining the optimal summary of the document based at least in part on the first and second attribute values. Of course, it will be appreciated that though the first and second highest-weighted combined candidate summaries generally will be the optimal choice from which to derive or obtain a summary of the document, other combined candidate summaries (i.e., not necessarily the first and/or the second highest-weighted combined candidates may be considered in alternate embodiments of the invention).

In another embodiment, the keyword comprises a first keyword and a second keyword. The optimal candidate summary may be based, at least in part, on a title of a document comprising the first keyword and one of the plurality of candidate summaries comprising the second keyword.

As indicated by block 265, the method 200 comprises constructing a summary result. In one embodiment, the summary result is the greater of the first and second highest-weighted combined candidates. In another embodiment, the summary result is a string comprising several of the highest-weighted first and second combined candidates. For example, the summary result can include the top three highest-weighted first and second combined candidates. In another embodiment, the summary result can include the three highest-weighted combined candidates, which together contain the greatest number of distinct query keywords. The summary result can be constructed using other suitable combinations of the combined candidates.

In one embodiment, summaries are displayed along with document titles, and the summary is computed independently of the title. In another embodiment, the summary is computed with consideration of the title. A size of the title and the summary may be adjusted accordingly. For example, there may be a fixed number of pixels available to display the title and summary. In such a case it may be desirable to shorten the title to display a longer summary. Candidate summaries may be generated from a title and the summary, and the optimal summary may be identified as above, and that the summary may begin with a candidate deriving from the title. The candidates for the title can start at the beginning of the title. There may be other information displayed along with the summary and title, such as the last access date of the document, or a URL, or filename identifying the document.

As indicated by block 270, the method 200 comprises communicating the summary result. In one embodiment, the summary result is communicated in a result set 124 to the client 102a via the network 106 as the summary of the document.

A computer readable storage medium of a server device, processor, or other device or application comprises instructions, that when executed, cause the server device, application, processor, or other device or application to perform method 200. Preferably, the server device, resource regulating application, and the computer readable storage medium are similar to that described above and with reference to FIG. 1. Alternatively, other suitable server devices, applications, computer readable media, processors, or other devices or applications can be used.

General

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. A method comprising:
    identifying a plurality of candidate summaries related to textual information based at least in part on a document;
    determining first and second attribute values based at least in part on the candidate summaries;
    determining a number of storage locations for the plurality of candidate summaries, the number of storage locations based at least in part on a size of the document;
    combining the plurality of candidate summaries into a plurality of combined candidate summaries;
    selecting from the plurality of combined candidate summaries a first highest-weighted combined candidate summary and a second highest-weighted combined candidate summary;
    comparing the first and second highest-weighted combined candidates; and
    determining an optimal candidate summary based at least in part on the first and second attribute values and at least in part on the comparison of the first and second highest-weighted combined candidate summaries; and
    outputting the optimal candidate summary.

2. The method of claim 1 further comprising tokenizing the document.

3. The method of claim 1, wherein the size of the document comprises a number of words disposed in the document.

4. The method of claim 1, wherein the size of the document comprises a number of character strings disposed in the document.

5. The method of claim 1, wherein the number of storage locations is based at least in part on at least one of the size of the document, a desired size of the summary, and a number of query terms.

6. The method of claim 2 further comprising tokenizing a portion of the document sufficient to generate a predetermined number of candidate summaries.

7. The method of claim 1, wherein the first and second attribute values comprise a number of words.

8. The method of claim 1, wherein the first and second attribute values comprise a pixel size.

9. The method of claim 1, wherein the first and second attribute values comprise a string length.

10. The method of claim 1, wherein a number of combined candidates is less than or equal to the number of storage locations.

11. The method of claim 1, wherein each of the storage locations comprises a bucket and wherein the first and second attribute values are mapped onto the bucket.

12. The method of claim 1, wherein the candidate summaries comprise at least one keyword.

13. The method of claim 12, wherein the keyword comprises a first keyword and a second keyword, the optimal candidate summary further determined based at least in part on a title of the document comprising the first keyword and one of the plurality of candidate summaries comprising the second keyword.

14. The method of claim 12, wherein the first and second highest-weighted combined candidates are selected based at least in part on a percentage of keywords included in the plurality of candidate summaries.

15. The method of claim 12, wherein the document comprises a plurality of sections and wherein the first and second highest-weighted combined candidates are selected based at least in part on multiple occurrences of the keyword in one of the plurality of sections.

16. The method of claim 12 further comprising adjusting a weighting of the first and second highest-weighted combined candidate summaries based at least in part on a number of the keywords spanned by the plurality of candidate summaries.

17. A method comprising:
    searching a document;
    identifying a keyword disposed in the document;
    identifying a plurality of candidate summaries related to textual information based at least in part on the document;
    determining a number of storage locations for the plurality of candidate summaries, the number of storage locations based at least in part on a size of the document;
    combining the plurality of candidate summaries into a plurality of combined candidate summaries;
    determining first and second attribute values based at least in part on the candidate summaries;
    selecting from the plurality of combined candidate summaries a first highest-weighted combined candidate summary and a second highest-weighted combined candidate summary;
    determining an optimal candidate summary based at least in part on the first and second attribute values; and
    comparing the first and second highest-weighted combined candidate summaries, wherein determining the optimal candidate summary is further based at least in part on the comparison of the first and second highest-weighted combined candidate summaries; and
    outputting a summary result including the optimal candidate summary.

18. A computer readable storage medium comprising instructions, that, when executed, cause an application to:

identify a plurality of candidate summaries related to textual information based at least in part on a document;

determine first and second attribute values based at least in part on the candidate summaries;

determine a number of storage locations for the plurality of candidate summaries, the number of storage locations based at least in part on a size of the document;

combine the plurality of candidate summaries into a plurality of combined candidate summaries;

select from the plurality of combined candidate summaries a first highest-weighted combined candidate summary and a second highest-weighted combined candidate summary;

compare the first and second highest-weighted combined candidate summaries, and determine an optimal candidate summary based at least in part on the first and second attribute values and at least in part on the comparison of the first and second highest-weighted combined candidate summaries.

19. The computer readable storage medium of claim 18, further comprising instructions, that, when executed, cause an application to tokenize the document.

20. The computer readable storage medium of claim 18, wherein the size of the document comprises a number of words disposed in the document.

21. The computer readable storage medium of claim 18, wherein the size of the document comprises a number of character strings disposed in the document.

22. The computer readable storage medium of claim 18, wherein the number of storage locations is based at least in part on at least one of the size of the document, a desired size of the summary, and a number of query terms.

23. The computer readable storage medium of claim 18, wherein the first and second attribute values comprise a number of words.

24. The computer readable storage medium of claim 18, wherein the first and second attribute values comprise a pixel size.

25. The computer readable storage medium of claim 18, wherein the candidate summaries comprise a string length.

26. The computer readable storage medium of claim 18, wherein a number of combined candidate summaries is less than or equal to the number of storage locations.

27. The computer readable storage medium of claim 18, wherein each of the storage locations comprises a bucket and wherein the first and second attribute values are mapped onto the bucket.

28. The computer readable storage medium of claim 18, wherein the candidate summaries comprise at least one keyword.

29. The computer readable storage medium of claim 28, wherein the keyword comprises a first keyword and a second keyword, the optimal candidate summary determined based at least in part on a title of the document comprising the first keyword and one of the plurality of candidate summaries comprising the second keyword.

30. The computer readable storage medium of claim 28, wherein the first and second highest-weighted combined candidates are selected based at least in part on a percentage of the keywords included in the plurality of candidate summaries.

31. The computer readable storage medium of claim 28, wherein the document comprises a plurality of sections and wherein the first and second highest-weighted combined candidates are selected based at least in part on multiple occurrences of the keyword in one of the plurality of sections.

32. The computer readable storage medium of claim 19 further comprising instructions, that, when executed, cause an application to tokenize a portion of the document sufficient to generate a predetermined number of candidate summaries.

33. The computer readable storage medium of claim 28 further comprising instructions, that when executed cause an application to adjust a weighting of the first and second highest-weighted combined candidate summaries based at least in part on a number of the keywords spanned by the plurality of candidate summaries.

* * * * *